No. 800,357. PATENTED SEPT. 26, 1905.
F. BURNHAM.
VEHICLE TIRE.
APPLICATION FILED DEC. 20, 1904.

Witnesses:- Inventor
F. C. Fliedner Floyd Burnham
By Geo. H. Strong
Atty

UNITED STATES PATENT OFFICE.

FLOYD BURNHAM, OF FRESNO, CALIFORNIA.

VEHICLE-TIRE.

No. 800,357. Specification of Letters Patent. Patented Sept. 26, 1905.

Application filed December 20, 1904. Serial No. 237,640.

*To all whom it may concern:*

Be it known that I, FLOYD BURNHAM, a citizen of the United States, residing at Fresno, in the county of Fresno and State of California, have invented new and useful Improvements in Vehicle-Tires, of which the following is a specification.

My invention relates to a tire for vehicles which is especially adapted for buggies and all carriages.

It consists in the combination of a tubular casing and an interior filling formed of twisted rope and in details of construction which will be more fully explained by reference to the accompanying drawings, in which—

Figure 1:
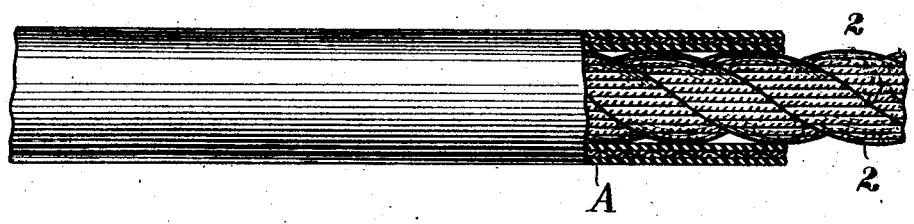
Figure 2:
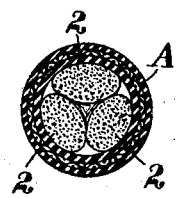

Figure 1 shows a small portion of a tire, partially in section. Fig. 2 is a transverse section of same.

Various combinations of tubular tire-casings, with internal filling material made more or less elastic, have hitherto been made; but such filling has been partially or wholly composed of a semiplastic mass which is subject to considerable compression and which, if the casing be badly cut or broken, can be ejected from the casing by the pressure brought upon it.

It is the object of my invention to provide a tire having all the advantages of a tubular elastic casing with a substantially rigid interior support, which is provided by an ordinarily-formed rope of sufficient diameter to entirely fill the interior of the casing.

As shown in the accompanying drawings, A is the casing, made in the usual manner of layers of woven or other fibrous materials, combined with rubber or other equivalent elastic substance in the manner usual in the construction of what are known as "pneumatic" tires. This casing will in any case be of such length as to surround and fit upon the wheel for which it is designed and may be made of any suitable or desired diameter. Within this casing I fit a rope which is first formed, in the usual manner, of three or more strands 2, twisted together, and the rope thus formed has a diameter such that it fits closely within the exterior tube or casing A. When tires are manufactured new, the rope is inclosed with the fabric of the casing in the course of manufacture. The ends of the rope may be united so as to form an endless structure in the same manner that the exterior casing is made, and when once finished the tire is complete in this form and will so remain until worn out or otherwise destroyed. If it is desired to repair old tires already made in this manner, the tire is first separated transversely at some point in its length, and a rope of sufficient diameter to fit the interior of the tire is drawn into it. The ends of the rope may be either abutted or otherwise joined, and the ends of the tire are then joined together, connected, and vulcanized in the manner usual for such tire repairs.

A tire constructed in this manner has the advantage of the outer soft elastic shoe or casing and the substantially rigid interior support produced by the rope, which entirely fills the outer tube and prevents an undue compression and flattening of the latter under a load. At the same time it will be understood that by reason of the rope being twisted up in strands, as previously described, there is a certain amount of elasticity in the twisting of the rope-yarns and in the subsequent twisting of the rope-yarns into the strands which complete the ropes, partly arising from the character of the material and partly by reason of the spirally-disposed interspaces between the strands which form the rope.

A tire thus formed needs no inflation and is not subject to flattening or injurious wear by reason of punctures, cuts, or damage which may occur from the rough road.

Having thus described my invention, what I claim, and desire to secure by Letters Patent, is—

1. An improved tire composed of an outer tubular casing having relatively thin walls of substantially uniform thickness and forming an inner chamber which is concentric with the exterior of the tube, and a multistrand rope filling said inner chamber and supporting the walls of the casing.

2. A tire having an outer tube composed of woven fabric and rubber and an elastic covering material said tube having relatively thin walls of substantially uniform thickness and forming an inner chamber concentric with the exterior of the tube, and a multistrand rope filling said chamber and supporting said walls.

In testimony whereof I have hereunto set my hand in presence of two subscribing witnesses.

FLOYD BURNHAM.

Witnesses:
F. E. COOK,
O. GIBBS.